No. 853,905. PATENTED MAY 14, 1907.
T. E. SMITH.
PERPETUAL ACCOUNT BOOK.
APPLICATION FILED JULY 5, 1904.

Witnesses:
Franklin E. Low
Louis A. Jones

Inventor:
Thomas Edgar Smith
By his Attorney
Charles S. Gooding

No. 853,905. PATENTED MAY 14, 1907.
T. E. SMITH.
PERPETUAL ACCOUNT BOOK.
APPLICATION FILED JULY 5, 1904.
2 SHEETS—SHEET 2.
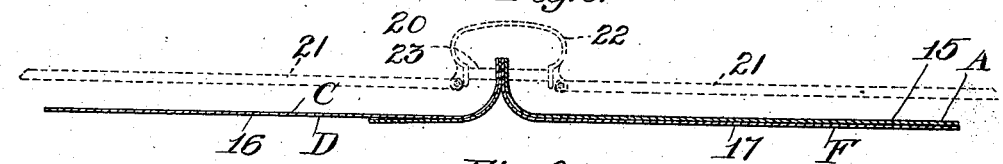
Witnesses:
Franklin E. Low
Lewis H. Jones
Inventor:
Thomas Edgar Smith
By his Attorney,
Charles N. Gooding.

UNITED STATES PATENT OFFICE.

THOMAS EDGAR SMITH, OF WINTHROP, MASSACHUSETTS.

PERPETUAL ACCOUNT-BOOK.

No. 853,905. Specification of Letters Patent. Patented May 14, 1907.

Application filed July 5, 1904. Serial No. 215,454.

*To all whom it may concern:*

Be it known that I, THOMAS EDGAR SMITH, a citizen of the United States, residing at Winthrop, in the county of Suffolk and State of Massachusetts, have invented new and useful Improvements in Perpetual Account-Books, of which the following is a specification.

This invention relates to an improved perpetual account book, the object of the invention being, first, to obviate the labor of transferring accounts to a new ledger or other account book once a year or at the end of any period; second, to entirely obviate the labor of bringing forward or repeating balances; third, to allow the insertion of new names to take the place vacated by old or discontinued names perpetually and immediately; fourth, to increase or decrease pages mechanically and perpetually without any transferring of the record thereon; fifth, to make it possible to open a ledger or other record of this kind on a typewriter, so far as the names of different customers are concerned; sixth, to avoid the usual waste of paper and space by using practically all of the surface on both sides of a leaf.

The invention consists in the combination and arrangement of parts set forth in the following specification and particularly pointed out in the claims thereof.

Referring to the drawings:—Figure 1 is a plan view of my improved account book illustrating two of the account sheets bound together, with the name sheet inserted between their bound edges, said account sheets covering the months January, February, March and April. Fig. 2 is a plan view similar to Fig. 1 with the account sheets bound together and the name leaf sheet introduced between their bound edges, said account sheets indicating the months of March, April, May and June. Fig. 3 is a plan view of my improved account book illustrating the account sheets bound together with the name leaf sheet introduced between their bound edges and indicating the months of May, June, July and August. Fig. 4 is a plan view similar to Figs. 1, 2 and 3 indicating the months July August, September and October. Fig. 5 is a plan view similar to Figs. 1 to 4 inclusive, indicating the months September to December, inclusive. Fig. 6 is a detail plan view of one leaf of said book ruled for accounts. Fig. 7 is a detail plan view of the name leaf. Fig. 8 is a plan view of another leaf ruled for accounts. Fig. 9 is a section taken on line 9—9 of Fig. 5, showing three account leaves and one name leaf attached to a loose leaf binder, said loose leaf binder being indicated in dotted lines.

Like numerals refer to like parts throughout the several views of the drawings.

In carrying my invention into practical operation in its preferred form, three leaves 15, 16 and 17 ruled and printed for accounts are used and one leaf ruled and printed for names. The leaves 15, 16 and 17 are ruled alike on both sides, both as to horizontal and vertical lines, and the name leaf 18 is ruled horizontally in the same manner as the leaves 15, 16 and 17.

In the following description the face and back of the leaf 15 are indicated, respectively, by the letters A and B; the face and back of the leaf 16 by the letters C and D; the face and back of the leaf 17 by the letters E and F; and the face and back of the name leaf are indicated, respectively, by the letters G and H. Each of the account leaves is ruled upon the opposite sides thereof, respectively, with vertical lines for debit, credit and balance columns, and at the head of these columns is indicated the month; also each of said leaves has a column devoted to meter readings, this being the form of ruling and lettering used in my improved account book as particularly adapted for use by gas companies. Another vertical column is devoted to numerals from 1 to 7 for the accounts of seven different customers. The name and address leaf is ruled horizontally to correspond with the horizontal ruling of the account leaves and the horizontal spaces are numbered from 1 to 7 to correspond therewith, and the names and addresses of different customers preferably written in duplicate upon opposite sides thereof corresponding to each number from 1 to 7 inclusive. At one end of each of the account leaves and of the name leaf is a space 19 perforated for binding said leaves in a loose leaf binder.

The leaf 15 has upon its face A at the top of the two sets of debit and credit columns the months January and February printed thereon and upon its back B the months July and August. The leaf 16 has upon its face C the months March and April and upon its back D the months September and October. The leaf 17 has upon its face E the months May and June and upon its back F the months November and December. In Fig. 1 the leaves 15 and 16 and the name leaf 18 are shown bound together with the front faces thereof, A, C and G, respectively, uppermost.

In the use of my perpetual account book, assuming the leaves 15, 16 and 18 to be first attached together as illustrated in Fig. 1; after the accounts for January, February, March and April have been entered and balanced, thus filling the front faces A and C of the leaves 15 and 16, respectively, the third account leaf 17 is inserted, as illustrated in Fig. 2, by inserting the binding space 19 of said leaf 17 between the binding spaces 19, 19 of the account leaf 15 and the name leaf 18, as illustrated in Fig. 2. The uppermost faces of the leaves 16 and 17 read as to the months, and as illustrated in said Fig. 2, March, April, May and June. It will be noted that in said Fig. 2, the name and address leaf 18 is turned toward the left from the position shown in Fig. 1, so that the reverse side H of said name and address leaf is uppermost. When the accounts for May and June have been entered and balanced, the accounts for July and August are obtained by reversing the account leaf 15 and inserting the same between the name and address leaf 18 and the account leaf 16 (see Fig. 3). When the accounts for July and August have been entered and balanced, the accounts for September and October are presented to view by inserting the account leaf 16, with its reverse side uppermost, as shown in Fig. 4, and finally the months November and December are presented to view by inserting the account leaf 17, with the reverse side F thereof uppermost, as illustrated in Fig. 5.

It will thus be seen that by alternately inserting different leaves, as hereinbefore described, the objects of this invention, hereinbefore set forth, will be accomplished. It will be noted that by reversing the account leaves 15, 16 and 17 it is never necessary to turn over a leaf in order to continue a record, the old balance being always on the front side of one of the two pages in use. This invention is particularly useful for companies using a large list of names and the horizontal ruled type of ledger or other account book.

By the use of the loose name leaf it will be seen that the names and addresses may be printed thereon by the use of a typewriter, said name leaf being sufficiently narrow to allow of this being done. It will also be noted that by the use of the name leaf new names can be introduced in the place of old names which have been dropped and the account pertaining thereto discontinued. The loose name leaf being placed in the center, between the two account leaves, renders it very easy to follow the names along the ruled lines to their respective accounts. Another advantage of the loose name leaf is that being in the center it allows of the independent filing or revision of the names.

It will readily be seen that if an old customer should discontinue business, a new customer could be placed upon the account book in the line or space previously occupied by the old customer without changing the books in any way other than to change the name leaf, substituting for the old customer's name the new customer's name in the same space, and when enough customers have dropped out to make it an object, a new name leaf can readily be printed upon a typewriter, or, if desired, it can be written and substituted in place of the old name leaf.

The name leaf and the three account leaves are connected together by being paged, the three account leaves being paged exactly the same on either side and exactly the same as the name leaf in the center. In the account leaves and name leaf illustrated in the drawings the pages are numbered 1. It will be seen that the number of names can be indefinitely multiplied by using more than one name leaf. For instance, if thirty names were used upon one name leaf there would be thirty accounts included on the three account leaves and these leaves would all be numbered page 1, including the name leaf which would control this section of the record. Now, assuming thirty more names and accounts were started, a new name leaf would be used and six new pages on three new account leaves built up in the same manner with relation to said name leaf.

It is preferable in some cases, in starting a new account book of this character, to use all odd numbers. For instance, page 1 would be one series of accounts, page 3 the next series of accounts, page 5 for the next series of accounts, etc., in order to leave a space between each numbered page, as, for instance, page 2, page 4, page 6, etc., for the introduction of new names, especially in business where customers are arranged in routes, as in gas, telephone, electric light and water companies. In such cases, route 1 would cover a certain section of a city which at first might be represented by thirty names and if in this section of the city the number of customers increased to more than thirty, then in this same route the new customers would be placed with name leaf of page 2. Said name leaf and the three leaves connected thereto would each be headed page 2, thus keeping the routes always separate.

In Fig. 9 the leaves 15, 16, 17 and 18 are shown fastened to one form of binding 20, known in the art as a loose leaf binder, and consisting essentially of two covers 21, 21, pivotally attached to a back-plate 22, the leaves being fastened together by pins 23 fast to said back-plate.

Having thus described my invention, what I claim and desire by Letters Patent to secure is:

1. A perpetual account book comprising a binding, a plurality of leaves ruled for accounts temporarily bound in said binding, said account leaves having the entire series of subdivisions of a certain period of time indicated thereon upon opposite sides thereof, the interval between the first-named subdivision upon the obverse side and the first-named subdivision upon the reverse side of any one of said leaves being equal to one half as many subdivisions as there are upon both sides of all of said leaves.

2. A perpetual account book comprising a binding, a plurality of leaves ruled for accounts temporarily bound in said binding, a leaf suitably designated for names temporarily bound in said binding between the bound edges of said account leaves, said account leaves having the entire series of subdivisions of a certain period of time indicated thereon upon opposite sides thereof, the interval between the first-named subdivisions upon the obverse side and the first-named subdivision upon the reverse side of any one of said account leaves being equal to one-half as many subdivisions as there are upon both sides of all of said account leaves.

In testimony whereof I have hereunto set my hand in presence of two subscribing witnesses.

THOMAS EDGAR SMITH.

Witnesses:
 CHARLES S. GOODING,
 ANNIE J. DAILEY.